US012686310B2

(12) United States Patent
Park et al.

(10) Patent No.: US 12,686,310 B2
(45) Date of Patent: Jul. 21, 2026

(54) LEVER DEVICE FOR SLIDING CONSOLE

(71) Applicants:HYUNDAI MOTOR COMPANY,
Seoul (KR); KIA CORPORATION,
Seoul (KR); **ECOPLASTIC
CORPORATION**, Gyeongju-si (KR)

(72) Inventors: Dong Jin Park, Daegu (KR); **Jong
Heon Lee, Suwon-si (KR); Hae Ju
Park, Gyeongju-si (KR); Cheon Ho
Kim, Hwaseong-si (KR); Byoung
Wook Kim, Hwaseong-si (KR); Jung
Yoon Jang, Hwaseong-si (KR); Byung
Yong Choi**, Hwaseong-si (KR)

(73) Assignees: Hyundai Motor Company, Seoul
(KR); Kia Corporation, Seoul (KR);
Ecoplastic Corporation, Gyeongju-si
(KR)

( * ) Notice: Subject to any disclaimer, the term of this
patent is extended or adjusted under 35
U.S.C. 154(b) by 0 days.

(21) Appl. No.: 18/418,806

(22) Filed: Jan. 22, 2024

(65) Prior Publication Data

US 2025/0178502 A1 Jun. 5, 2025

(30) Foreign Application Priority Data

Dec. 4, 2023 (KR) ......................... 10-2023-0173303

(51) Int. Cl.
F16H 19/04 (2006.01)
B60N 2/75 (2018.01)
(52) U.S. Cl.
CPC ............. B60N 2/793 (2018.02); F16H 19/04
(2013.01); B60N 2/773 (2018.02)

(58) Field of Classification Search
CPC ...................................................... F16H 19/04
See application file for complete search history.

(56) References Cited

U.S. PATENT DOCUMENTS 10,918,551 B2 * 2/2021 Wyslucha .............. F16M 13/04
11,827,133 B2 11/2023 Elsarelli
(Continued)

FOREIGN PATENT DOCUMENTS

CN 215332115 U 12/2021
EP 1197382 A1 4/2002
(Continued)

OTHER PUBLICATIONS

EESR for EP application No. 24153596.2, dated Jun. 27, 2024, 7
pages.

*Primary Examiner* — Gregory Robert Weber
(74) *Attorney, Agent, or Firm* — Fish & Richardson P.C.

(57) ABSTRACT

Disclosed is a lever device for a sliding console provided in
a sliding console slidable along a fixed rail provided in a
vehicle, and configured to operate an operation lever so that
locking is released from the fixed rail, and the lever device
provided in a sliding console is slidable along a fixed rail
provided in a vehicle and configured to operate an operation
lever to release locking of the fixed rail, includes: a housing
fastened to a cover of the sliding console; a knob slidingly
fastened to the housing; an operation rod configured to slide
in correspondence with an operation of the knob and allow-
ing the operation lever to be fastened to an end thereof to
operate the operation lever; and a power transmission unit
rotatably fastened to the housing and configured to rotate in
correspondence with an operation of the knob to slide the
operation rod.

13 Claims, 13 Drawing Sheets

(56)        References Cited

U.S. PATENT DOCUMENTS

| | | | |
|---|---|---|---|
| 12,072,003 B2 * | 8/2024 | Kato ..................... | A63F 13/218 |
| 2002/0145023 A1 | 10/2002 | Panhelleux et al. | |
| 2023/0084592 A1 | 3/2023 | Son et al. | |

FOREIGN PATENT DOCUMENTS

| | | | |
|---|---|---|---|
| KR | 20070002431 A | 1/2007 | |
| KR | 20160044831 A | 4/2016 | |

* cited by examiner

100

<u>200</u>

LEVER DEVICE FOR SLIDING CONSOLE

CROSS REFERENCE TO RELATED APPLICATION

The present application claims priority to Korea Patent Application No. 10-2023-0173303, filed Dec. 4, 2023, the entire contents of which is incorporated herein for all purposes by this reference.

FIELD

The present disclosure relates to a lever device for a sliding console, and more particularly, to a lever device for a sliding console configured to press a knob provided in a cover of the sliding console so as to release locking of the sliding console.

BACKGROUND

In general, the storage space in the interior of a vehicle includes a console box, a glove box, an overhead box, and the like. These storage spaces are for storing items used in the interior of the vehicle depending on their locations, and are installed to be opened and closed for the user's convenience.

Among the storage spaces, the console box, which is also called a center console, is a box-shaped storage space provided between the driver seat and the passenger seat, and typically positioned together with the gear shift lever.

The console box is useful for storing frequently used items, since the console box is provided between the driver seat and the passenger seat such that the stored items may be easily used. In addition, the upper part (e.g., a lid) of the console box is typically made of a soft material and may be used as an armrest for a driver or a passenger.

Meanwhile, in the case of recent automobiles, there is a trend that an autonomous driving system is installed. The autonomous driving system provides a function capable of automatically driving a vehicle by controlling the vehicle without a driver's operation.

The autonomous driving function currently installed in vehicles provides partially autonomous driving, which may control the speed and steering, parking assistance, obstacle avoidance, etc., of the vehicle, and the autonomous driving technology is continuously developing.

Therefore, as the technological limitations of the autonomous driving function are being overcome, there is a high possibility of gradually developing into a fully autonomous driving function, and accordingly, various activities may be performed while driving by utilizing the space in the vehicle.

The existing console box provided in the vehicle between the driver seat and the passenger seat is fixedly mounted to the vehicle body. The console box plays an important role in forming a space on the front seat side.

Therefore, research and development on the sliding console allowing a console box to become movable is underway in order to more efficiently use an interior space of the vehicle through the autonomous driving.

Such a sliding console is fastened to a moving rail configured to slide along a fixed rail provided in the vehicle and is configured to lock or unlock the moving rail to or from the fixed rail to fix or move the sliding console.

There is a need for a device which allows the user to easily lock or unlock the sliding console.

PRIOR ART DOCUMENT

Patent Document

Document 1: Korea patent No. 10-2598407 (Nov. 1, 2023)

SUMMARY

The present disclosure is originated to solve the above-said problems, and an object of the present disclosure is to provide a lever device for a sliding console capable of releasing locking of a sliding console by pressing a knob provided in a cover of the sliding console.

One embodiment is a lever device for a sliding console provided in a sliding console slidable along a fixed rail provided in a vehicle and configured to operate an operation lever to release locking of the fixed rail.

In more detail, the lever device for a sliding console may include a housing fastened to a cover of the sliding console; a knob slidingly fastened to the housing; an operation rod configured to slide in correspondence with an operation of the knob and allowing the operation lever to be fastened to an end thereof to operate the operation lever; and a power transmission unit rotatably fastened to the housing and configured to rotate in correspondence with an operation of the knob to slide the operation rod.

Here, the knob may include: a knob body slidingly fastened to the housing; a guide protrusion protruding from the knob body and inserted into a guide slit formed in the housing to guide a slide movement of the knob body; and a rack gear part protruding from the knob body and having gear teeth in a same direction as a movement direction of the knob body.

In addition, the knob may include: a guide bar protruding from the knob body in a same direction as the movement direction of the knob body and inserted through a through hole formed in the housing; and an elastic member inserted into the guide bar to be disposed between the knob body and the housing and configured to apply an elastic force to the knob body.

The power transmission unit may include: a pinion gear part rotatably fastened to the housing and engaged with the rack gear part; and a driving gear part configured to rotate together with the pinion gear part and engaged with a driven gear part formed in the operation rod to transmit a rotational power.

In addition, the operation rod may include: an operation rod body having a slide hole in a longitudinal direction to allow a support protrusion formed in the housing to be inserted thereinto; a driven gear part formed in a longitudinal direction from an outer circumferential surface of the operation rod body and engaged with the driving gear part; and an operation lever fastening part formed at an end of the operation rod body and allowing one end of the operation lever to be inserted thereinto and fastened thereto.

In addition, the lever device for a sliding console according to an embodiment of the present disclosure may include: a damper part rotatably fastened to the housing, engaged with the driven gear part to rotate, and having a rotational resistance to act as a resistance to a linear movement of the operation rod.

In addition, the lever device for a sliding console according to an embodiment of the present disclosure may further include: an inertial stopper provided in the housing and configured to lock the knob to prevent the knob from sliding when being rotated by an inertial force beyond a certain level.

In more detail, the inertial stopper may include: a stopper housing fastened to the housing; an inertial driver rotatably fastened to the stopper housing and having a weight at one end thereof to rotate by an inertial force; a pressing rod slidingly fastened to the stopper housing and rotatably fastened to another end of the inertial driver; and a stopper pin slidingly inserted into the housing, and configured in such a way that one end thereof moves when the one end is pressed by a pressing protrusion formed in the pressing rod and another end thereof protrudes toward a moving path of the knob to restrict a movement of the knob.

In addition, the inertial stopper may further include: a stopper elastic member provided between the stopper pin and the housing and configured to apply an elastic force to the stopper pin.

According to a lever device for a sliding console of the present disclosure, there is an effect of improving the user's convenience since locking of the sliding console can be easily released by pressing a knob provided in a cover of the sliding console.

In addition, according to the present disclosure, there is an effect of preventing a safety accident by restricting the sliding console to not to be unlocked when a sudden stopping or a collision accident of the vehicle occurs.

DETAILED DESCRIPTION

Figure 1:
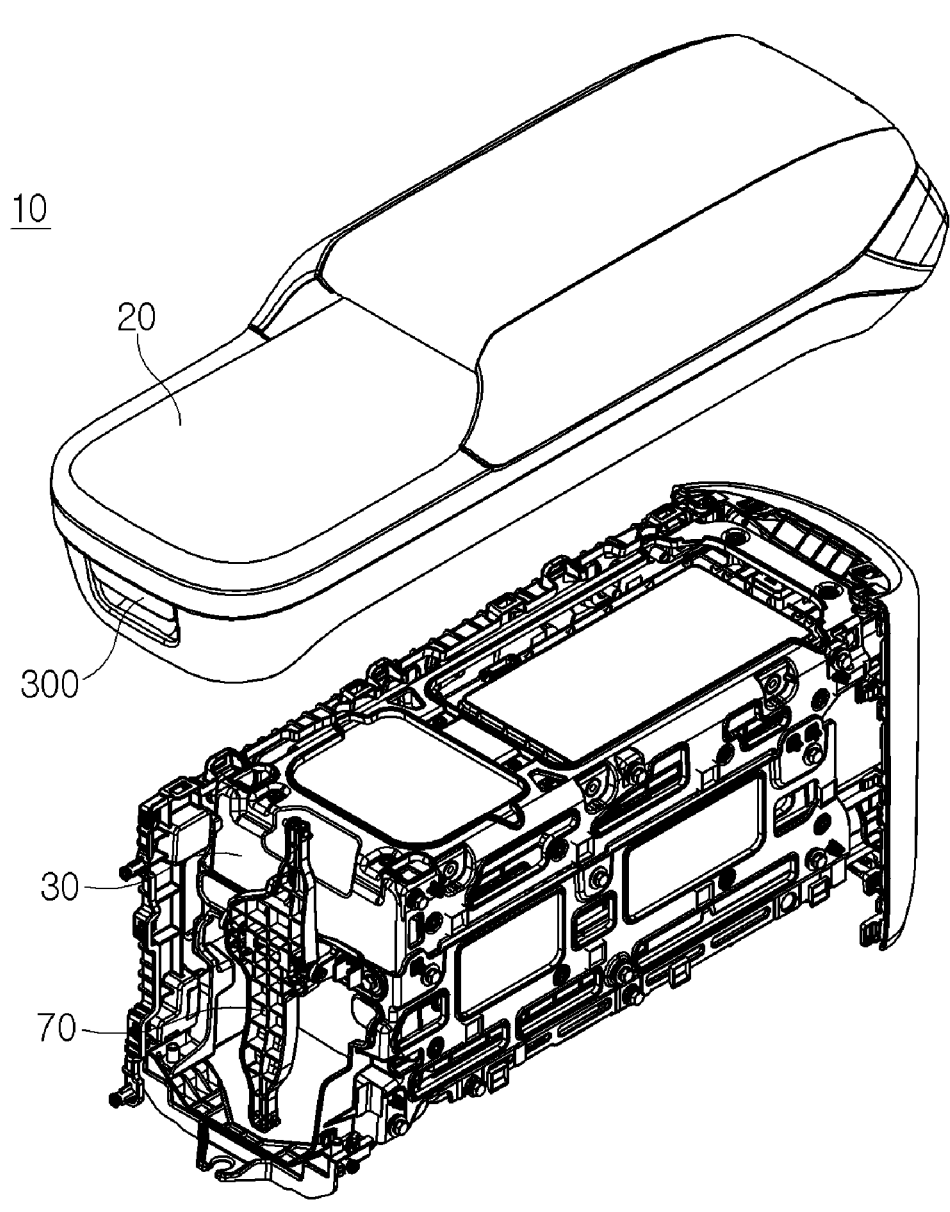
FIG. 1 is an exploded perspective view schematically illustrating a sliding console having a lever device for a sliding console according to an embodiment of the present disclosure.

Hereinafter, preferred embodiments of the present invention will be described in more detail with reference to the accompanying drawings.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

The terms used in the present specification are merely used to describe specific embodiments and are not intended to limit the present invention. A singular expression includes a plural expression unless a description to the contrary is specifically pointed out in context.

Although not defined otherwise, all terms including technical terms and scientific terms used herein have the same meanings as those generally understood by a person having ordinary knowledge in the art to which the present invention pertains. Terms defined in a dictionary generally used are additionally interpreted as having a meaning consistent with the related art documents and contents currently disclosed, and unless defined otherwise, are not interpreted as having an ideal or very official meaning.

Hereinafter, exemplary embodiments of the present invention will be described in further detail with reference to the accompanying drawings.

Figure 2:
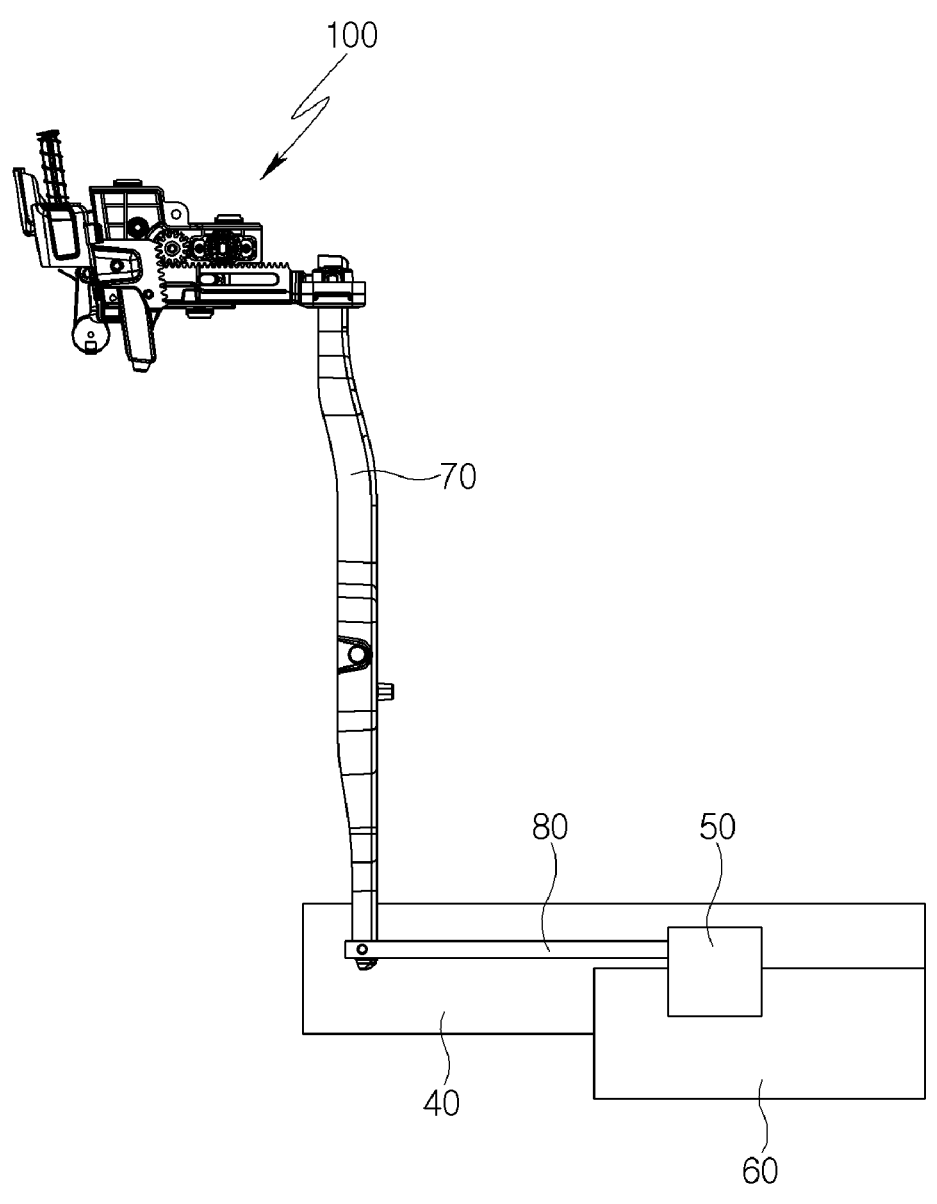
FIG. 2 is a view schematically illustrating a state in which a lever device for a sliding console according to an embodiment of the present disclosure is connected to a locking part.
Figure 3:
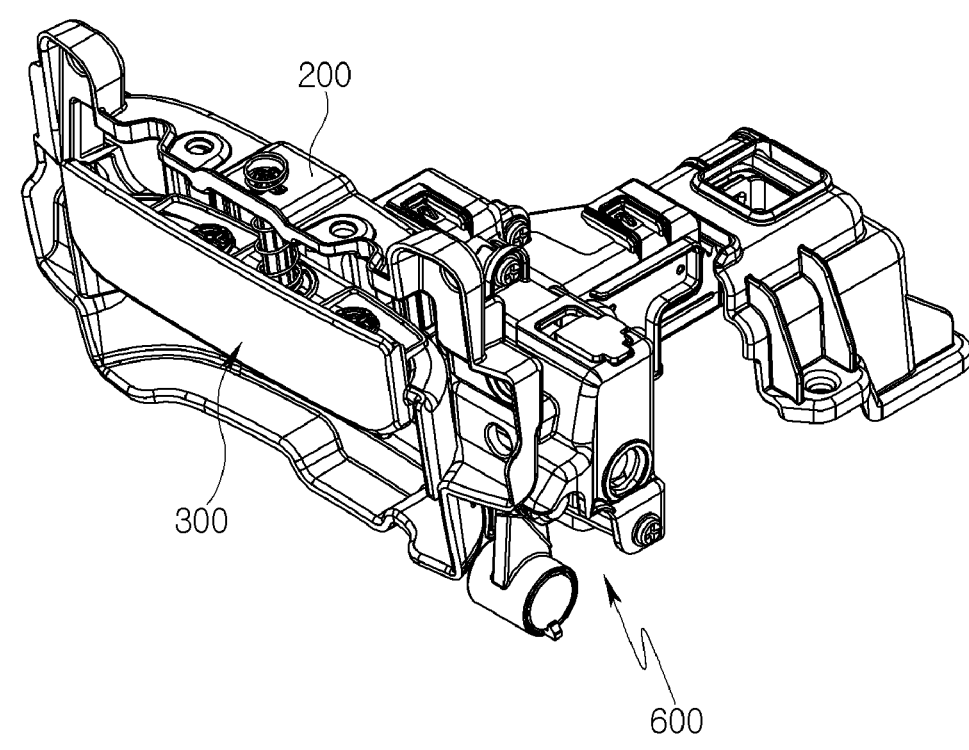
FIG. 3 is a perspective view schematically illustrating a lever device for a sliding console according to an embodiment of the present disclosure.
Figure 4:
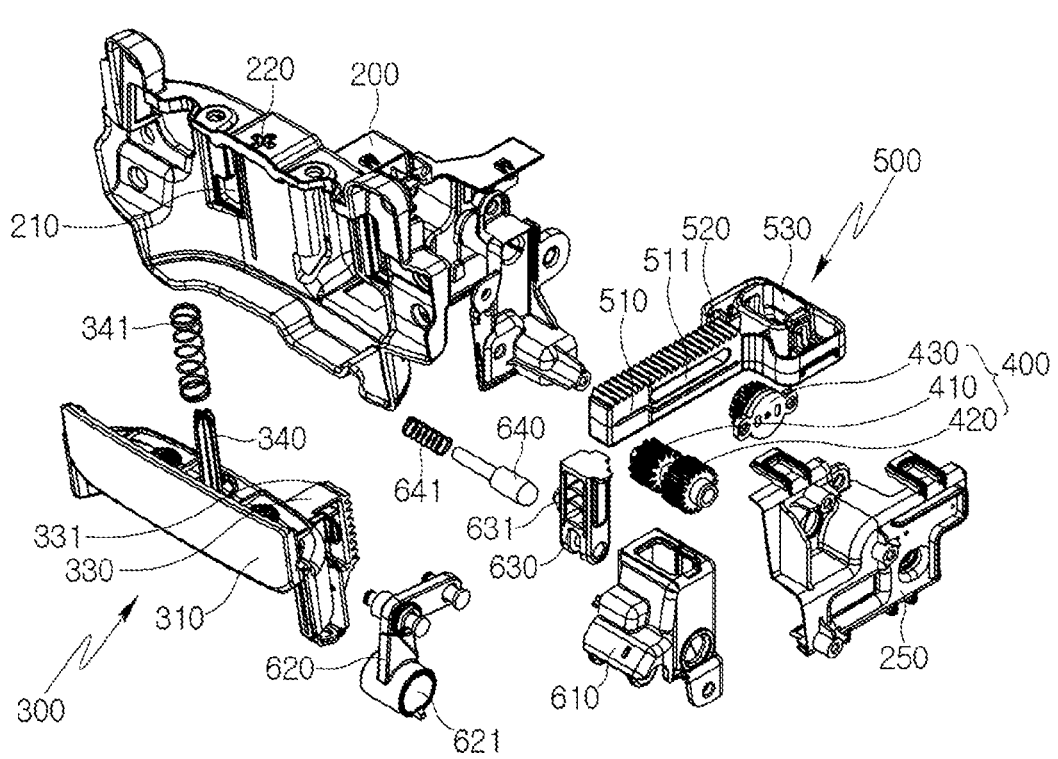
FIG. 4 is an exploded perspective view schematically illustrating a lever device for a sliding console according to an embodiment of the present disclosure.
Figure 5:
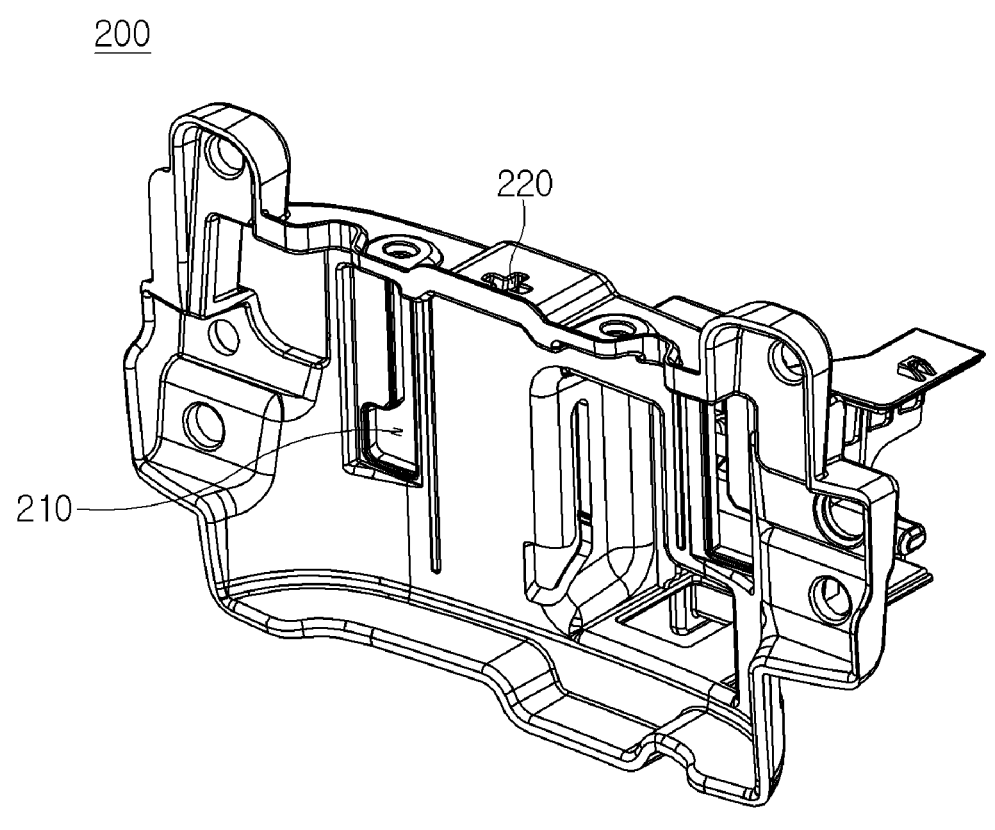
FIGS. 5 and 6 are views schematically illustrating a housing extracted from a lever device for a sliding console according to an embodiment of the present disclosure.
Figure 6:
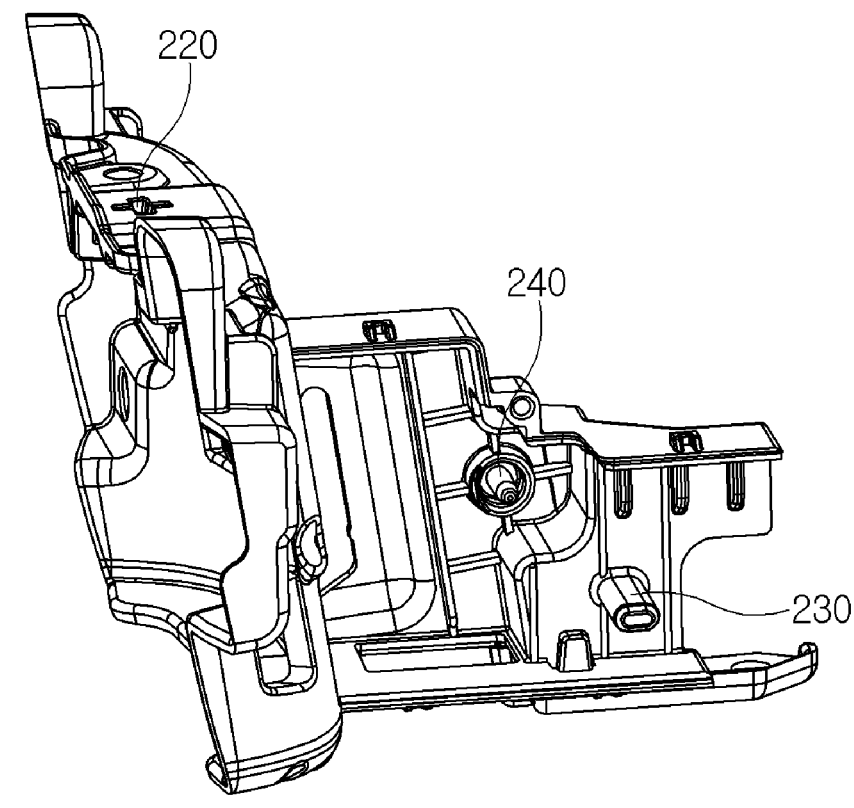
Figure 7:
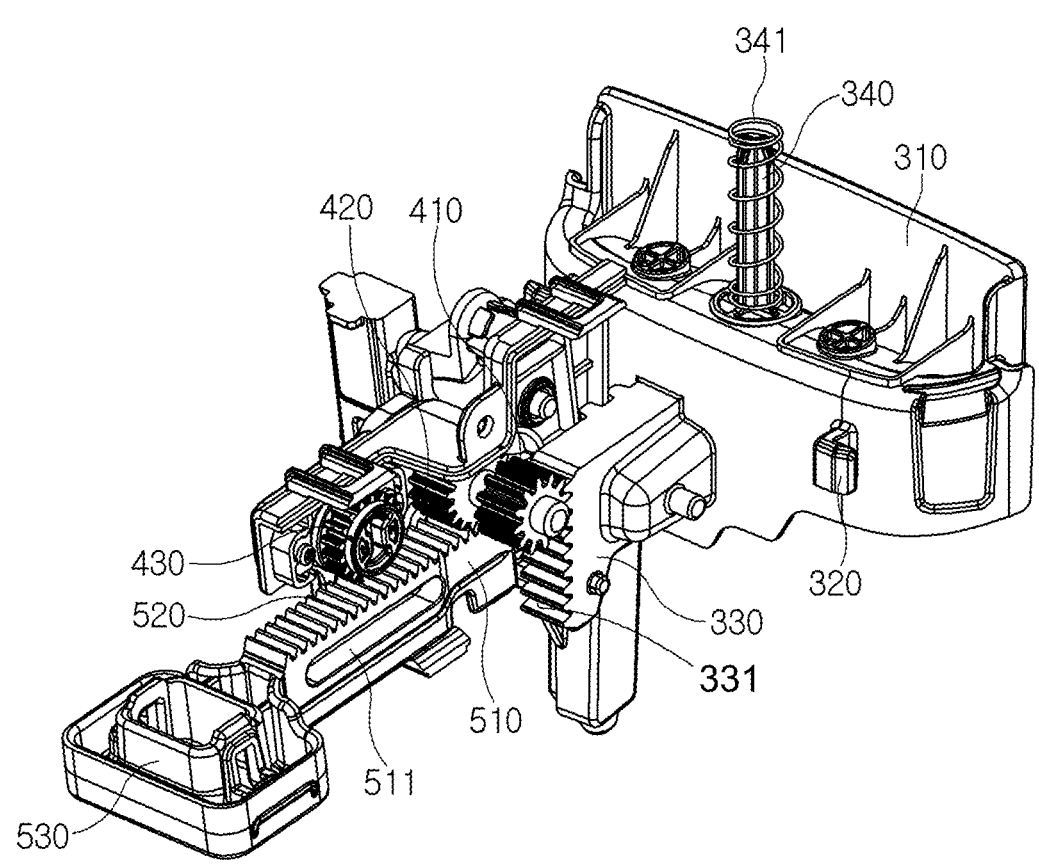
FIG. 7 is a perspective view schematically illustrating a state in which a housing is removed from a lever device for a sliding console according to an embodiment of the present disclosure.
Figure 8:
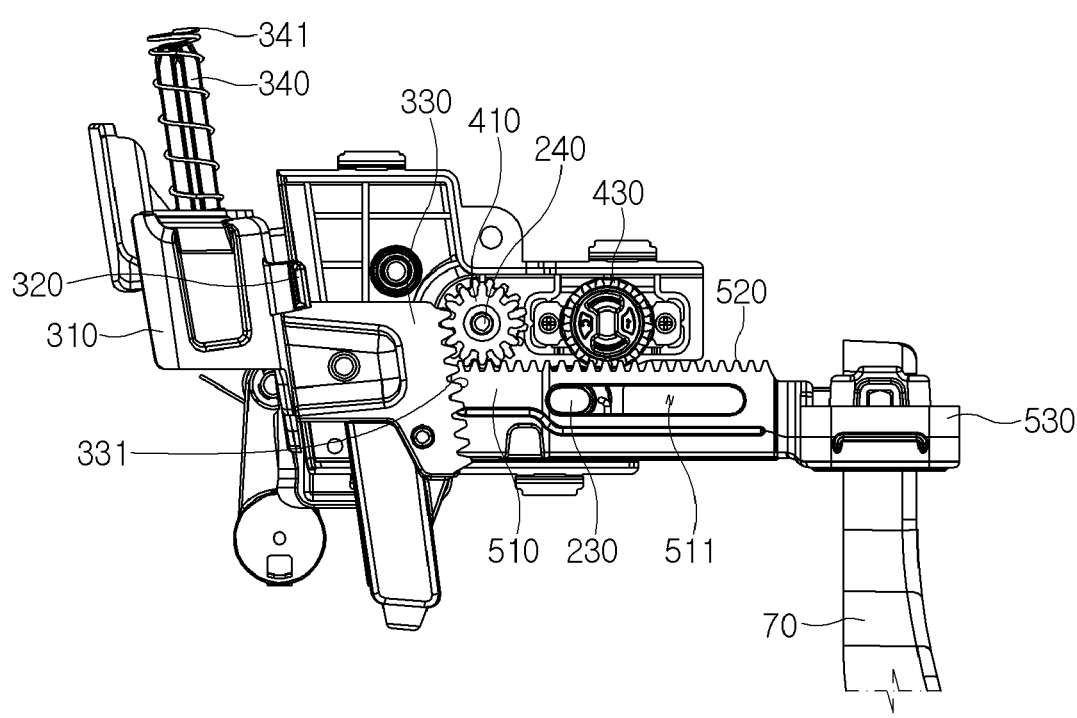
FIG. 8 is a side view schematically illustrating a state in which a housing is removed from a lever device for a sliding console according to an embodiment of the present disclosure.
Figure 9:
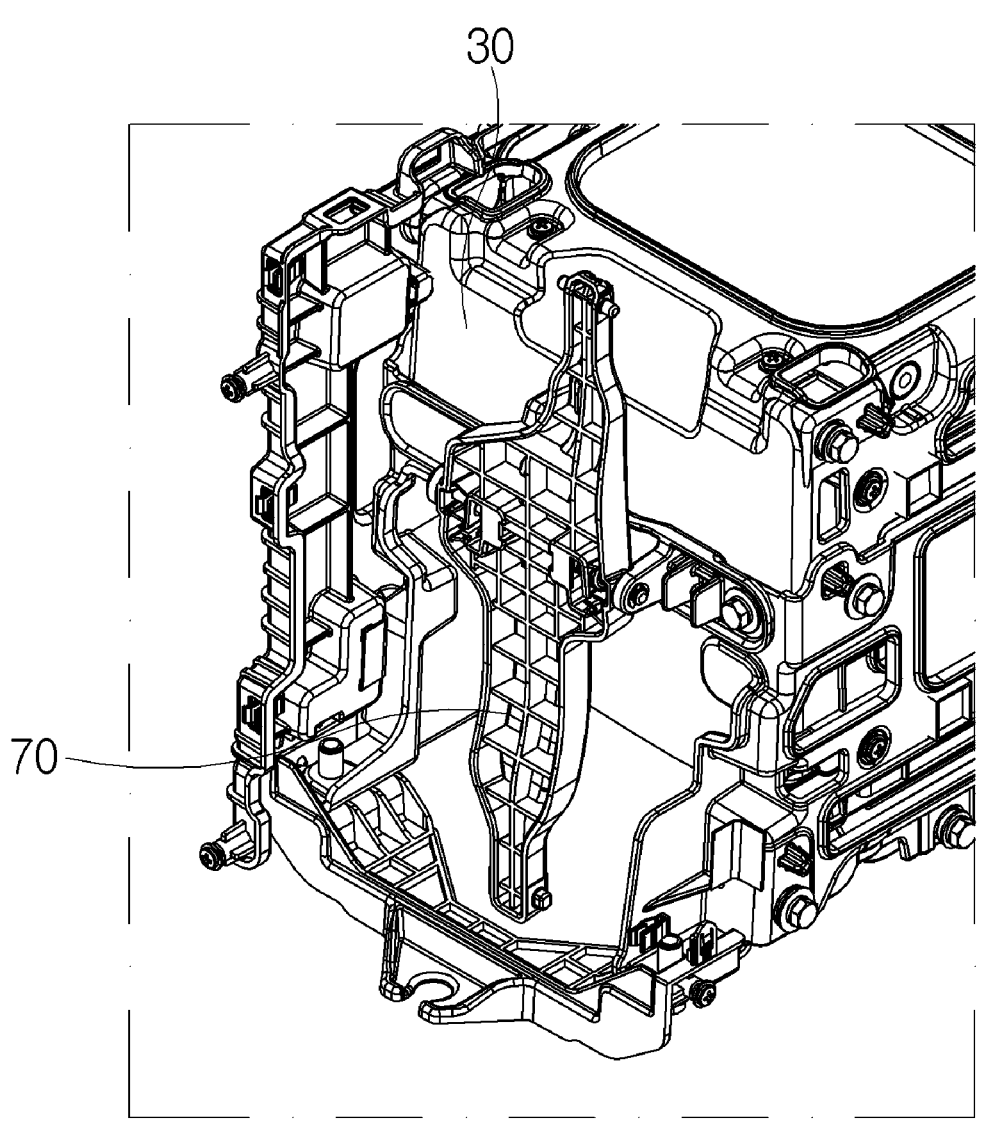
FIG. 9 is a view schematically illustrating a state in which an operation lever connected to a lever device for a sliding console according to an embodiment of the present disclosure is installed.
Figure 10:
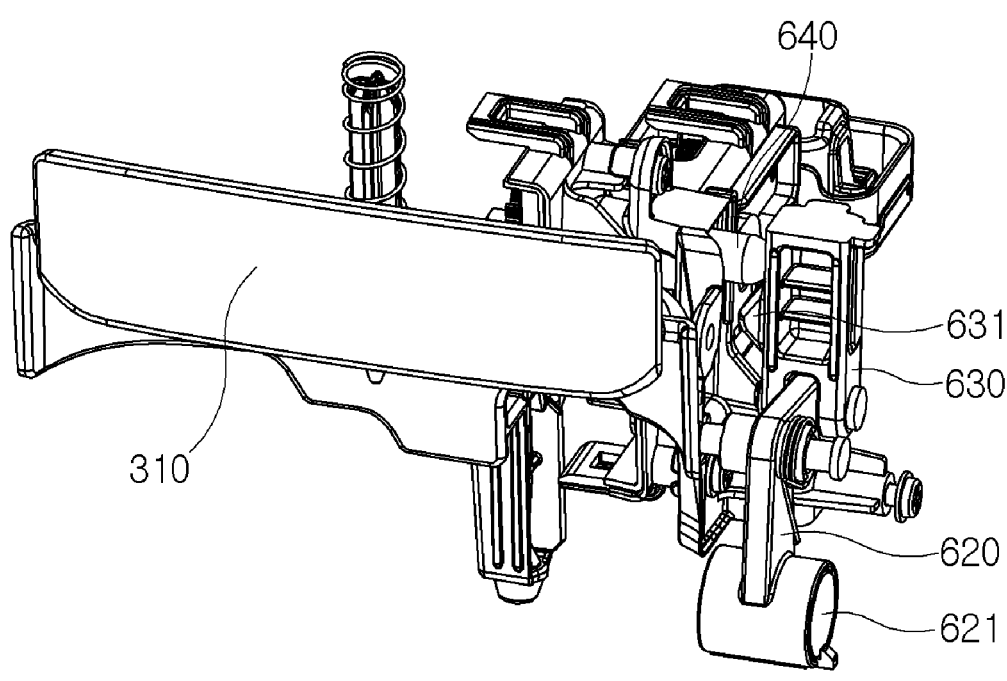
FIGS. 10 and 11 are views schematically illustrating a state in which an inertial stopper does not operate in a lever device for a sliding console according to an embodiment of the present disclosure.
Figure 11:
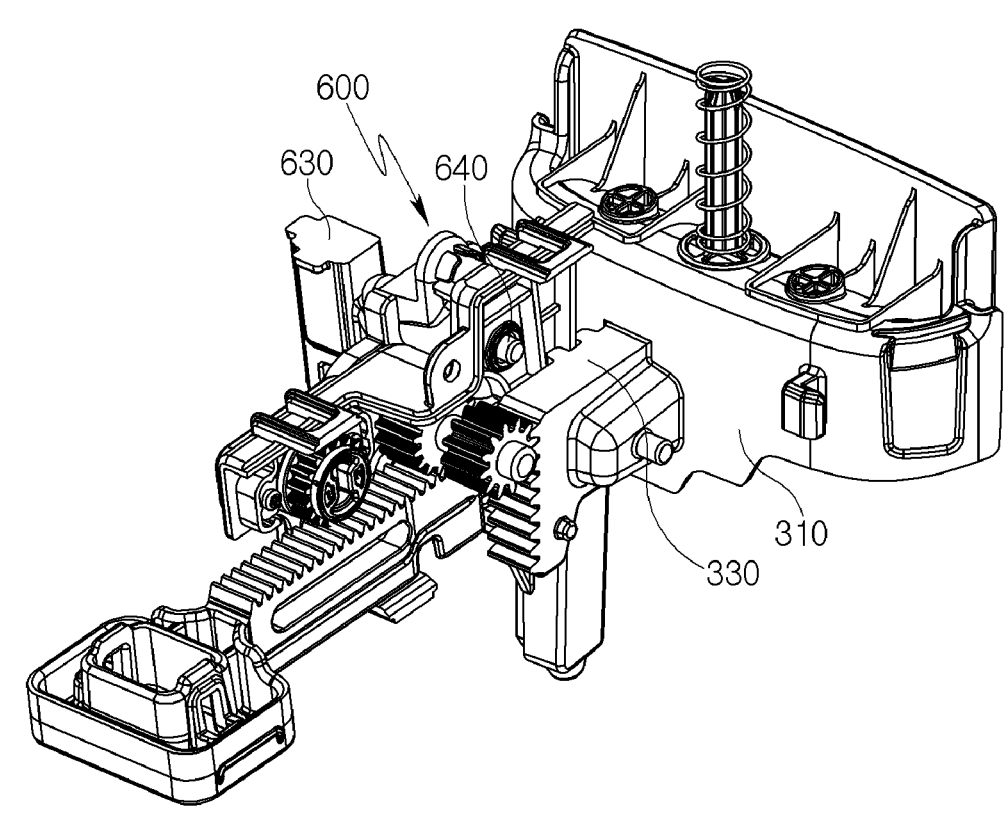
Figure 12:
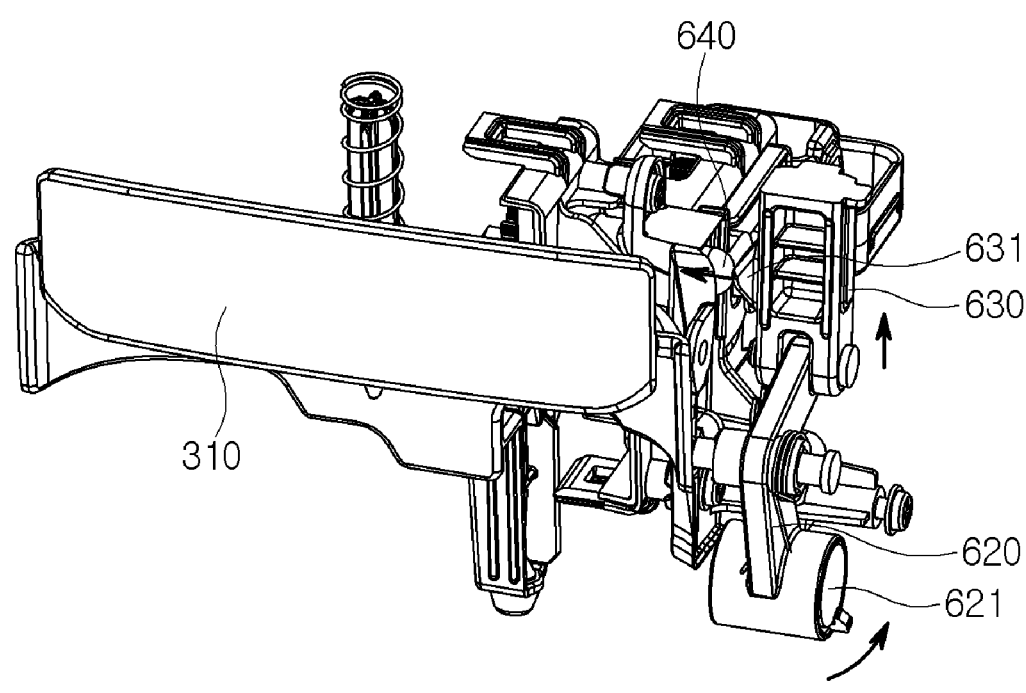
FIGS. 12 and 13 are views schematically illustrating a state in which an inertial stopper operates in a lever device for a sliding console according to an embodiment of the present disclosure.
Figure 13:
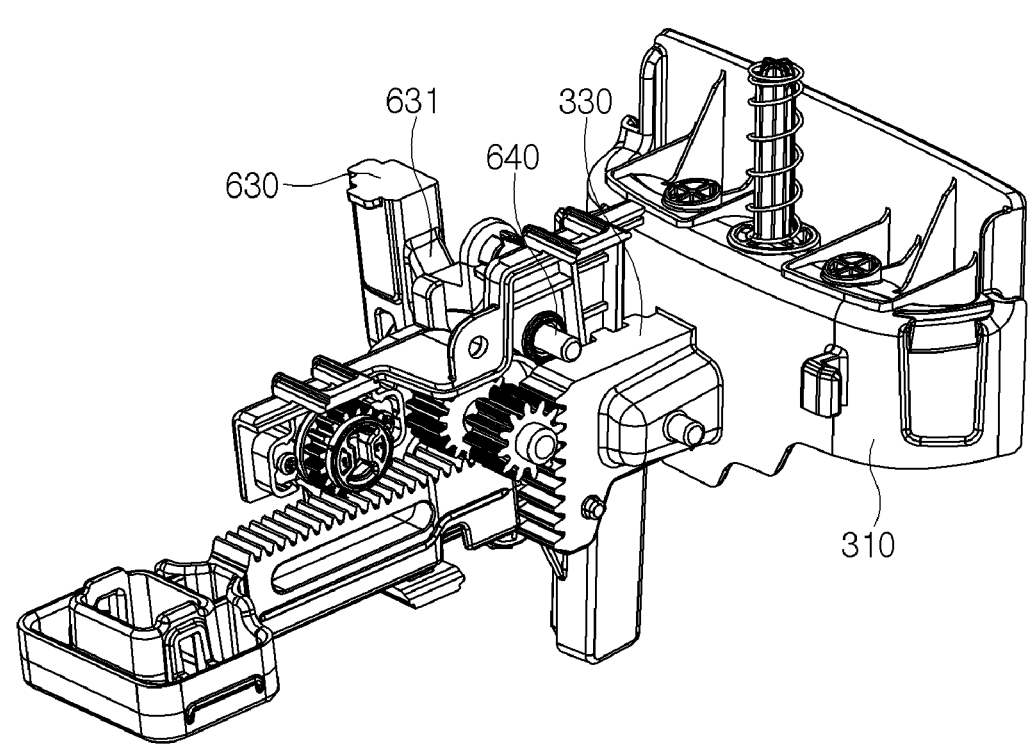

FIG. 1 is an exploded perspective view schematically illustrating a sliding console having a lever device for a sliding console according to an embodiment of the present disclosure, FIG. 2 is a view schematically illustrating a state in which a lever device for a sliding console according to an embodiment of the present disclosure is connected to a locking part, FIGS. 3 and 4 are a perspective view and an exploded perspective view schematically illustrating a lever device for a sliding console according to an embodiment of the present disclosure, FIGS. 5 and 6 are views schematically illustrating a housing extracted from a lever device for a sliding console according to an embodiment of the present disclosure, FIGS. 7 and 8 are a perspective view and a side view schematically illustrating a state in which a housing is removed from a lever device for a sliding console according to an embodiment of the present disclosure, FIG. 9 is a view schematically illustrating a state in which an operation lever connected to a lever device for a sliding console according to an embodiment of the present disclosure is installed, FIGS. 10 and 11 are views schematically illustrating a state in which an inertial stopper does not operate in a lever device for a sliding console according to an embodiment of the present disclosure, and FIGS. 12 and 13 are views schematically illustrating a state in which an inertial stopper operates in a lever device for a sliding console according to an embodiment of the present disclosure.

Referring to FIGS. 1 to 13, a lever device for a sliding console according to an embodiment of the present disclosure 100 is provided in a sliding console 10 installed on a moving rail 40 configured to slide along a fixed rail 60 provided in a vehicle, and is configured to operate an operation lever 70 to release locking from the fixed rail 60.

In more detail, the lever device for a sliding console 100 according to an embodiment of the present disclosure is provided to a cover 20 of the sliding console 10 so that the user can operate the lever device 100 easily, and the lever device for a sliding console 100 according to an embodiment of the present disclosure is fastened to one end of the operation lever 70 rotatably fastened to a body 30 of the sliding console 10, and the other end of the operation lever 70 is fastened to a moving rod 80 provided in the moving rail 40.

With this configuration, when the user operates the lever device for a sliding console 100, one end of the operation lever 70 is pulled and rotated to move the moving rod 80, and the moving rod 80 operates a locking part 50 provided in the moving rail 40 so as to release locking of the moving rail 40 to move the sliding console 10.

Here, the locking part 50 is provided in the moving rail 40, and is configured to be operated by the moving rod 80 to release locking from the fixed rail 60, and may be formed in any form.

As such, the lever device for a sliding console 100 for rotating the operation lever 70 includes a housing fastened to the cover 20 of the sliding console 10, a knob 300 slidingly fastened to the housing 200, an operation rod 500 configured to slide in correspondence with an operation of the knob 300 and allowing the operation lever 70 to be fastened to an end thereof to operate the operation lever 70, and a power transmission unit 400 slidingly fastened to the housing 200, and configured to rotate to slide the operation rod 500 when the knob 300 operates.

That is, it is configured that when the user presses to slide the knob 300, the power transmission unit 400 slides the operation rod 500 while the power transmission unit 400 rotates so that the operation rod 500 rotates the operation lever 70.

In more detail, the knob 300 includes a knob body 310 slidingly fastened to the housing 200, a guide protrusion 320 protruding from the knob body 310 and inserted into a guide slit 210 formed in the housing 200 to guide a slide movement of the knob body 210, and a rack gear part 330 protruding from the knob body 310 and having gear teeth 331 formed in the same direction as a movement direction of the knob body 310.

Here, the guide protrusions 320 are provided at both sides of the knob body 310, and are configured to prevent shaking when the knob body 310 slides.

Further, the knob 300 may include a guide bar 340 protruding in the same direction as the movement direction of the knob body 310 and inserted through a through hole 220 formed in the housing 200, and an elastic member 341 inserted into the guide bar 340 to be disposed between the knob body 310 and the housing and configured to apply an elastic force to the knob body 310.

With this configuration, the knob body 310 slides when an external force (pressing by the user) is applied to the knob body 310, the guide protrusion 320 moves along the guide slit 210, the guide protrusion 320 moves along the guide slit 210, the guide bar 340 is inserted through the through hole 220, and the elastic member 341 is compressed, thereby the elastic force is generated. In addition, when the external force is removed from the knob body 310, the knob body 310 returns to its original position by the elastic force of the elastic member 341.

The power transmission unit 400 includes a pinion gear part 410 rotatably fastened to the housing 200 and engaged with the rack gear part 330, and a driving gear part 420 configured to rotate together with the pinion gear part 410 and engaged with a driven gear part 520 formed in the operation rod 500 to transmit a rotational power.

Here, the pinion gear part 410 and the driving gear part 420 have the same rotation shaft and are configured to rotate together, and the rotation shaft is inserted into a support pin 240 formed in the housing 200 to be rotatably supported.

In addition, the operation rod 500 includes an operation rod body 510 having a slide hole 511 formed in a longitudinal direction to allow a support protrusion 230 formed in the housing 200 to be inserted thereinto, a driven gear part 520 formed in a longitudinal direction on an outer circumferential surface of the operation rod body 510 and engaged with the driving gear part 420; and an operation lever fastening part 530 formed at an end of the operation rod body 510 and allowing one end of the operation lever 70 to be inserted thereinto and fastened thereto.

With this configuration, referring to FIG. 8, when the knob body 310 slides upward by an external force, the rack gear part 330 moves upward as well, and the pinion gear part 410 engaged with the gear teeth 331 of the rack gear part 330 rotates in a clockwise direction. At this time, the driving gear part 420 rotates in the clockwise direction together with the pinion gear part 410, and since the driving gear part 420 is engaged with the driven gear part 520, the operation rod body 510 moves to the left, thereby rotating the operation lever 70.

In addition, the lever device 100 for a sliding console according to an embodiment of the present disclosure further includes a damper part 430 rotatably fastened to the housing 200 and engaged with the driven gear part 520 to rotate, and having a rotational resistance so as to act as a resistance to a linear movement of the operation rod 500.

That is, when the operation rod 500 slides fast, there may occur problems of collision noise, or destruction of the configuration because of the collision. Therefore, the present disclosure further includes the damper part 430 acting as a damper, which serves as a resistance to the slide movement of the operation rod 500, thereby preventing the operation rod 500 from moving beyond a certain speed.

The housing 200 may be configured in such a manner that the knob 300, the power transmission unit 400, and the operation rod 500 are assembled inside through an open side, and the housing cover 250 is fastened to an open side of the housing 200 so that the open side of the housing 200 can be closed.

In addition, the lever device for a sliding console 100 according to an embodiment of the present disclosure may further include an inertial stopper 600 provided in the housing 200, and configured to lock the knob 300 to prevent the knob 300 from sliding when being rotated by an inertial force beyond a certain level.

That is, an inertial force beyond a certain level is generated when the vehicle suddenly stops, or a vehicle collision occurs, and the operation rod 500 slides by the inertial force to operate the operation lever 70, thereby the locking of the sliding console 10 is released.

In order to prevent the above-said release, the present disclosure further includes the inertial stopper 600 such that the knob 300 is restricted from moving, thereby preventing unlocking of the sliding console 10.

In more detail, the inertial stopper 600 may include: a stopper housing 610 fastened to the housing 200; an inertial driver 620 rotatably fastened to the stopper housing 610 and having a weight 621 at one end thereof to rotate by an inertial force; a pressing rod 630 slidingly fastened to the stopper housing 610 and rotatably fastened to the other end of the inertial driver 620; a stopper pin 640 slidingly inserted into the housing 200, and configured in such a way that one end thereof moves when the one end is pressed by a pressing protrusion 631 formed in the pressing rod 630 and the other end thereof protrudes toward a moving path of the knob 300 to restrict a movement of the knob 300; and a stopper elastic member 641 disposed between the stopper pin 640 and the housing 200 and configured to apply an elastic force to the stopper pin 640.

With this configuration, when the vehicle suddenly stops, or a vehicle collision occurs, an inertial force to move the vehicle forward is generated in the weight 621, and while the inertial driver 620 rotates by the inertial force, the pressing rod 630 is slid. At this time, the pressing protrusion 631 formed in the pressing rod 630 presses one end of the stopper pin 640, and the other end of the stopper pin 640 protrudes toward a moving path of the knob 300, as illustrated in FIG. 13, thereby restricting a movement of the knob 300. That is, the other end of the stopper pin 640 protrudes upward of the rack gear part 330, thereby restricting a movement of the rack gear part 330.

Further, when the inertial force is removed, the stopper pin 640 returns to its original position by the inertial force of the stopper elastic member 641, and the restriction is released so that the knob 300 can move.

As such, the lever device for a sliding console according to the present disclosure may easily release locking of the sliding console 10 by pressing knob 300 provided in the cover 20 of the sliding console 10.

In addition, the present disclosure further includes the inertial stopper 600 so that when a sudden stop or collision accident of the vehicle occurs, locking of the sliding console 10 is restricted so that the locking cannot be released, thereby preventing a safety accident.

According to a lever device for a sliding console of the present disclosure, there is an effect of improving the user's convenience since locking of the sliding console can be easily released by pressing a knob provided in a cover of the sliding console.

In addition, according to the present disclosure, there is an effect of preventing a safety accident by restricting the sliding console to not to be unlocked when a sudden stopping or a collision accident of the vehicle occurs.

Hereinabove, the present disclosure has been described in detail through a specific implementation, but this is for specifically illustrating the present disclosure, and the present disclosure is not limited thereto. It is clear that the present disclosure can be modified or improved by a person having ordinary knowledge in the field within the technical spirit of the present disclosure.

All simple modifications or changes of the present disclosure fall within the scope of the present disclosure, and the specific protection scope of the present disclosure will be clarified by the appended claims.

REFERENCE NUMERALS

100: lever device for a sliding console
200: housing
210: guide slit
220: through hole
230: support protrusion
240: support pin
250: housing cover
300: knob
310: knob body
320: guide protrusion
330: rack gear part
331: gear teeth
340: guide bar
341: elastic member
400: power transmission unit

410: pinion gear part
420: driving gear part
430: damper part
500: operation rod
510: operation rod body
511: slide hole
520: driven gear part
530: operation lever fastening part
600: inertial stopper
610: stopper housing
620: inertial driver
621: weight
630: pressing rod
631: pressing protrusion
640: stopper pin
641: stopper elastic member

What is claimed is:

1. A lever device provided in a sliding console slidable along a fixed rail provided in a vehicle, the lever device being configured to operate an operation lever to release locking of the fixed rail, the lever device comprising:
a housing configured to fasten to a cover of the sliding console;
a knob slidingly coupled to the housing;
a power transmission unit rotatably coupled to the housing and configured to rotate based on an operation of the knob; and
an operation rod configured to slide in a longitudinal direction of the housing based on a rotation of the power transmission unit, the operation rod having an end coupled to the operation lever to operate the operation lever.

2. The lever device of claim 1, wherein the knob comprises:
a knob body slidingly coupled to the housing;
a guide protrusion protruding from the knob body and inserted into a guide slit defined in the housing to guide a slide movement of the knob body; and
a rack gear part protruding from the knob body and having gear teeth that are sequentially spaced apart from one another in a movement direction of the knob body.

3. The lever device of claim 2, wherein the knob comprises:
a guide bar protruding from the knob body in a same direction as the movement direction of the knob body and inserted through a through hole provided in the housing; and
an elastic member inserted into the guide bar to be disposed between the knob body and the housing and configured to apply an elastic force to the knob body.

4. The lever device of claim 2, wherein the power transmission unit comprises:
a pinion gear part rotatably fastened to the housing and engaged with the rack gear part; and
a driving gear part configured to rotate together with the pinion gear part and engaged with a driven gear part provided in the operation rod to transmit a rotational power.

5. The lever device of claim 4, wherein the operation rod comprises:
an operation rod body having a slide hole in the longitudinal direction to allow a support protrusion provided in the housing to be inserted thereinto;
the driven gear part provided in the longitudinal direction at an outer circumferential surface of the operation rod body and engaged with the driving gear part; and

9

10 an operation lever fastening part provided at an end of the operation rod body and allowing one end of the operation lever to be inserted thereinto and fastened thereto.

6. The lever device of claim 5, further comprising:
a damper part rotatably fastened to the housing, engaged with the driven gear part to rotate, and having a rotational resistance to act as a resistance to a linear movement of the operation rod.

7. The lever device of claim 2, wherein each of the gear teeth extends perpendicular to the movement direction of the knob body.

8. The lever device of claim 1, further comprising:
an inertial stopper provided in the housing and configured to lock the knob to prevent the knob from sliding when being rotated by an inertial force beyond a certain level.

9. The lever device of claim 8, wherein the inertial stopper comprises:
a stopper housing fastened to the housing;
an inertial driver rotatably fastened to the stopper housing and having a weight at one end thereof to rotate by inertial force;
a pressing rod slidingly fastened to the stopper housing and rotatably fastened to another end of the inertial driver; and a stopper pin slidingly inserted into the housing, wherein one end of the stopper pin is configured to move based on the one end being pressed by a pressing protrusion provided in the pressing rod, and another end of the stopper pin is configured to protrude toward a moving path of the knob to thereby restrict a movement of the knob.

10. The lever device of claim 9, wherein the inertial stopper further comprises:
a stopper elastic member provided between the stopper pin and the housing and configured to apply an elastic force to the stopper pin.

11. The lever device of claim 1, wherein the operation rod is configured to slide linearly in the longitudinal direction, and the knob is configured to slide linearly in a movement crossing the longitudinal direction.

12. The lever device of claim 1, wherein the operation rod extends in the longitudinal direction and is configured to move linearly in the longitudinal direction.

13. The lever device of claim 1, wherein the operation rod extends in the longitudinal direction, and
wherein the power transmission unit comprises a pinion gear configured to rotate about an axis crossing the longitudinal direction.

* * * * *